United States Patent [19]

Bolieau

[11] Patent Number: 4,503,773
[45] Date of Patent: Mar. 12, 1985

[54] AFT END IGNITER FOR FULL, HEAD-END WEB SOLID PROPELLANT ROCKET MOTORS

[75] Inventor: Christopher W. Bolieau, Brigham City, Utah

[73] Assignee: Thiokol Corporation, Chicago, Ill.

[21] Appl. No.: 453,318

[22] Filed: Dec. 27, 1982

[51] Int. Cl.³ .......................... F02K 9/18; F02K 9/30; F02K 9/95
[52] U.S. Cl. .................................... 102/202; 60/256; 102/287
[58] Field of Search ............... 102/202, 205, 287, 288, 102/291; 60/256

[56] References Cited

U.S. PATENT DOCUMENTS

| | | | |
|---|---|---|---|
| 2,979,896 | 4/1961 | Perkins | 102/202 X |
| 3,000,311 | 9/1961 | Stanley | 102/202 |
| 3,003,419 | 10/1961 | Fite | 102/202 |
| 3,324,656 | 6/1967 | Bradshaw | 102/202 X |
| 3,347,039 | 10/1967 | Zeman | 60/256 X |
| 3,392,673 | 7/1968 | King | 60/256 X |
| 3,811,358 | 5/1974 | Morse | 102/287 X |
| 4,080,901 | 3/1978 | Heier et al. | 102/202 X |
| 4,232,608 | 11/1980 | Wrightson | 102/291 X |
| 4,378,674 | 4/1983 | Bell | 102/202 X |

Primary Examiner—Charles T. Jordan
Assistant Examiner—John E. Griffiths, Jr.
Attorney, Agent, or Firm—Gerald K. White

[57] ABSTRACT

An igniter for high-performance rocket motors having a full, head-end web of propellant in the forward end of the motor comprises a closed, rigid pressure vessel having walls which are formed of a consumable filament structure. The igniter includes a hollow cylindrical solid propellant having a high surface grain area which operates at high pressure and is removably attached to a liner that is provided in a cavity in the aft end of the propellant. The liner is machinable with the motor propellant grain thereby facilitating propellant grain cutback if required by a change in mission of the motor. The thrust produced by the igniter neither applies stresses to the motor propellant nor exerts any forces tending to eject it from the cavity.

8 Claims, 2 Drawing Figures ic
AFT END IGNITER FOR FULL, HEAD-END WEB SOLID PROPELLANT ROCKET MOTORS The Government has rights in this invention pursuant to Contract No. F04611-80-C-0031 awarded by the U.S. Air Force.

BACKGROUND OF THE INVENTION

1. Field of the Invention

The present invention relates to an improved igniter for solid fuel rocket motors and has particular utility in high performance full, head-end web solid propellant rocket motors.

2. Description of the Prior Art

The conventional igniter for large solid fuel rocket motors is a miniature rocket motor that is known in the art as a "pyrogen" igniter. Typically, a pyrogen igniter is mounted in the forward end of a motor through a hole in the propellant. In some high-performance rocket motors, however, a pyrogen igniter is impractical to use because of the full, head-end web of the propellant in the forward end of the motor. The head-end web propellant grain design has the primary advantage providing a higher mass fraction.

Full, head-end web solid propellant rocket motors are now being developed which have the capability of being offloaded, that is, having some of the propellant grain removed, to meet the specific total impulse requirements. This offload is achieved by machining out propellant from the aft end of the motor. As propellant is removed, the internal free volume of the motor increases proportionately. The larger free volume makes ignition of the motor more difficult. One way to improve the ignition process is to mount the igniter to the aft end of the motor propellant grain. The source of heat for ignition thus remains as close as possible to the surface being ignited, regardless of the degree of offload.

Mounting the igniter to the motor propellant grain introduces a problem. This is because upon ignition and burning of the propellant grain at the aft end of the motor the support for the igniter erodes. Such erosion tends to cause the igniter to become detached from the propellant grain with possible resulting damage to the rocket motor nozzle or the propellant. In order to avoid such damage, the igniter must be substantially consumed before becoming detached from the propellant. Additionally, the igniter must perform its intended function of igniting the propellant grain before being consumed. A further requirement is that the igniter must exhaust its output across the surface of the motor propellant surface regardless of the percent of offload.

SUMMARY OF THE INVENTION

An object of the invention is to provide an improved aft end igniter for full, head-end web solid propellant rocket motors.

Another object of the invention is to provide such an igniter that is effective to exhaust its output across the motor propellant surface regardless of the percent of offload.

Still another object of the invention is to provide such an igniter that does not depend upon a bond between the motor propellant grain and the igniter to hold igniter pressure.

A further object of the invention is to provide such an igniter having a high surface area grain which operates at high pressure thus producing a high mass flow at a controllable rate.

Another object of the invention is to provide such an igniter that does not have any envelope of insulation constraints in the motor nozzle and aft propellant grain area.

In accomplishing these and other objectives of the present invention, there is provided an igniter for rocket motors comprising a closed, rigid pressure vessel that does not depend on a bond between motor propellant grain and the igniter to hold the igniter pressure. The igniter chamber is formed by a consumable filament wound structure which is attached to a lined cutout or cavity in the motor propellant grain. The liner is a premolded plastic or rubber component which incorporates an attachment and removability feature of the igniter. In some embodiments of the invention, the liner is machinable so that propellant grain cutback can readily be effected if required by a change in mission of a particular rocket motor. The igniter can have a high surface area grain which operates at high pressure thus producing a high mass flow at a controllable rate.

The improved igniter, according to the invention, does not have any envelope of insulation constraints in the motor nozzle and aft grain area. The small amount of propellant displaced by the igniter has a minimal effect on the motor performance. The thrust of the igniter is neutral so it neither applies stresses to the motor propellant nor tries to eject the igniter from its cavity. The attachment/removability feature does not require a heavy structural component. A family of igniters may be required to accommodate various motor sizes and degrees of offload although some adjustment of output can be made by propellant charge size adjustment within a particular inert case envelope.

The igniter is initiated by a booster charge in a consumable tube inside the igniter grain cavity. The booster charge is confined for reliable vacuum ignition and is initiated by flame conducting leads originating at a through bulkhead initiator (TBI) on the motor case. The leads are bonded to the propellant grain by proven processes.

DESCRIPTION OF THE DRAWINGS

Having summarized the invention, a detailed description follows with reference being had to the accompanying drawings which form part of the specification, of which.

DESCRIPTION OF THE PREFERRED EMBODIMENTS

Figure 1:
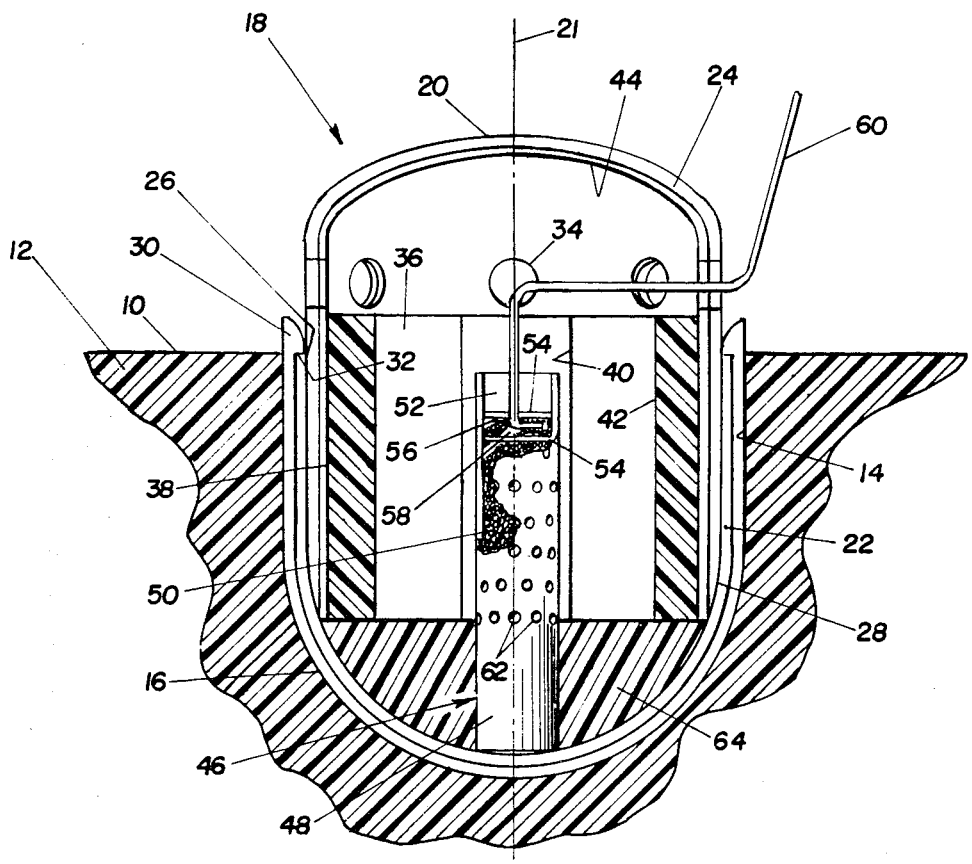
FIG. 1 is a cross sectional view of the aft end of a rocket motor full head-end-web propellant grain showing the improved igniter of the present invention installed in a cavity therein.

Referring to FIG. 1 of the drawings, the numeral 10 designates the surface at the aft end of a full head-end-web propellant grain 12 of a rocket motor. Mounted in a somewhat flexible urethane liner 16 in cavity 14 in the propellant grain aft end is an igniter indicated generally at 18.

The igniter 18 comprises a closed, rigid pressure vessel the walls of which are formed by a two-piece consumable filament wound structure or housing 20. Housing 20 is generally cylindrical in shape, having a longitudinal axis as indicated at 21, and is comprised of two oppositely facing mating cups, specifically an inner cup 22 and an outer cup 24 having a diameter that is sized to fit within the cup 22, the cups 22 and 24 being suitably bonded together at a bond joint indicated at 26. Desirably, the outer surface of the inner edge of the cup 24 is tapered, as shown at 28, to conform to the curvature of the inner surface of cup 22.

Each of cups 22 and 24 may be made of an aramid polymer fiber filament. An aramid polymer that is suitable for this purpose is available commercially from E. I. DuPont de Nemours, Wilmington, Del. under the trademark KEVLAR.

The urethane liner 16 for cavity 14 is made of a premolded plastic or rubber which is suitably bonded to the propellant grain 12 in the cavity 14. For facilitating the attachment of and removal of the igniter housing 20 within the cavity 14, the liner 16, in FIG. 1, is provided at its open end with an inwardly projecting peripheral ridge, specifically rim 30, having an annular shoulder 32 that faces cavity 14. When housing 20 is pressed into cavity 14 and liner 16, the rim 30 is forcibly expanded outwardly, allowing housing 20 to be moved thereinto. This action is facilitated by the hemispherical outer surface of the inner end of cup 22. As the housing 20 is moved into a fully inserted position in liner 16, the annular shoulder of liner 16 snaps over the end of cup 22, thereby capturing the housing 20 for attaching the igniter 18 to the propellant grain 12 and retaining it in the fully inserted position in cavity 14.

When, and if, it is desired to remove the igniter 18 from the liner 16 and cavity 14, this may readily be accomplished by spreading the flexible peripheral rim 30 of liner 16 thereby to release the brim of cup 22 and allowing housing 20 to be withdrawn, as by grasping openings 34 in the wall of cup 24, such openings 34 normally serving as nozzles.

Included within the outer cup 24 of igniter 18 is a hollow generally annular or cylindrical solid propellant 36 having a substantially constant outer diameter 38 and an undulating inner diameter varying between diameters indicated 40 and 42 whereby a relatively large surface area is provided at the inner surface of the annular propellant 36. This relatively large inner propellant surface, which may be star shaped in cross section, promotes rapid burning of the propellant 36 in consequence of which the igniter 18 may operate at high mass flow at a controllable rate. Desirably, as shown, an insulating liner indicated at 44 is provided on the entire inner surface of cup 24. Liner 44 may comprise a terpolymer elastomer and is suitably bonded to the inner surface of cup 24. Solid propellant 36, in turn, is suitably bonded to liner 44.

An initiator, indicated at 46, for activating the solid propellant 36 comprises a tubular urethane housing 48 that is filled with pellets 50. Pellets 50 comprise a booster charge and may be made of a mixture of boron and potassium nitrate. The aft end of tubular housing 48 is sealed with a plug of epoxy resin 52 which confines a pair of styrofoam disks 54. Sandwiched between the disks 54 is the end of a Hivelite fuze 56 surrounded by boron and potassium nitrate in powder form 58. A Hivelite fuze is a product of Teledyne McCormick-Selph, 3601 Union Road, P.O. Box 6, Hollister, Calif. and comprises a rapidly burning material that is encased in a lead sheath having a polyethylene jacket. To facilitate ignition of the powdered boron and potassium nitrate 58, the plastic jacket is stripped from the end of the Hivelite fuze that lies between the styrofoam disks 54. The booster charge 50 is confined for reliable vacuum ignition and is initiated by a Hivelite lead 60 originating at a through bulkhead initiator on the case of the motor, not shown.

Upon assembly of the cups 22 and 24, the annular solid propellant 36 and the initiator 46 substantially fill the space provided by cup 22 in cavity 14 of the rocket motor propellant 12 except for a thick layer of plastic foam 64, such as styrofoam.

When it is desired to ignite the propellant 12 of the rocket motor, an explosive output ordnance initiator, not shown, initiates a confined detonating fuze, not shown, which terminates at the through bulkhead initiator. The TBI is attached to the motor case by threads and provides the pressure seal between the inside and the outside of the motor. The TBI consists of a thin metal bulkhead integral with its housing with a small explosive charge on either side of the bulkhead. The donor explosive charge is detonated by the output from the confined detonating fuze. The shock wave produced by the donor explosive passes through the metal bulkhead without breaking it and initiates detonation in the receptor explosive charge on the other side of the barrier. This exploding receptor charge initiates burning in a flame output charge in the TBI. This flame output ignites pyrotechnic material that is located internally of the rocket motor case and which is in contact with the fuze lead 60. Flame produced by the pyrotechnic material is transmitted by lead 60 to the fuze 56. The fuze 56, as shown, may comprise the end of lead 60. Activation of the fuze 56 and pyrotechnic granules 58 produces hot gases that break through the inner styrofoam disk 54 to ignite the booster charge pellets 50. The resulting flaming gases are discharged through a plurality of holes 62 in the tubular housing 48 to ignite the annular solid propellant 36. The flaming gases resulting from burning of solid propellant 36 are forced out through the radial openings 34 in the cup 24 and spread across the aft surface 10 of the rocket motor propellant 12.

As ignition of the initiator 46 and the annular solid propellant 36 proceeds, the urethane tube 48 and the plastic foam 64 are rapidly consumed. The burning of the annular solid propellant 36 is most prolonged, such burning being confined to the housing 20 with flaming gases issuing radially from the opening 34, the urethane liner 16 preventing burning of the rocket motor propellant surface to which it is bonded.

It is noted that the thrust of the igniter 18 is neutral so that it neither applies stress to the rocket motor propellant 12, nor does it try to eject the igniter 18 from the cavity 14.

Figure 2:
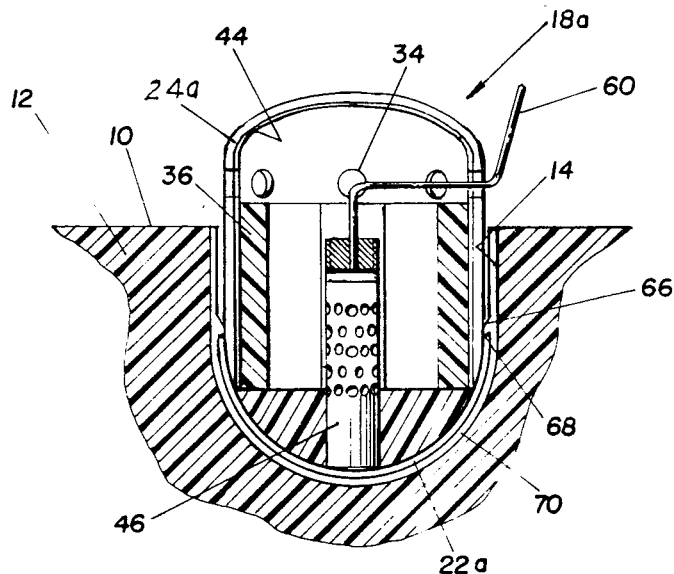
FIG. 2 is a cross sectional view similar to that of FIG. 1 illustrating a modification of the attachment/removability feature of the igniter.

In FIG. 2 there is illustrated a modification of the igniter of FIG. 1 wherein similar pyrogen igniters are embedded in a cavity 14 in the head-end-web propellant grain 12 of a rocket motor with different structural means being provided to effect the attachment/removability feature.

By reference to FIG. 2, it is seen that this modification differs from the arrangement of FIG. 1 in that the attachment/removability feature is provided by a snap lock arrangement comprising the spacing of an inwardly shaped peripheral ridge 66 and a shoulder 68 inwardly of the open end or rim of a urethane liner designated 70, for the cavity 14 in the rocket motor propellant 12. For accommodating such inward spacing of peripheral rim 66 and shoulder 68, the cups forming the igniter housing, designated 18a in FIG. 2 are modified. Thus, the inner cup, designated 22a is made shorter, and the outer cup, designated 24a, is made longer. The structure otherwise may be substantially the same. Positioning of igniter 18a into attachment with the aft end of propellant grain 12 may be achieved by pushing it axially into cavity 14 until the brim of cup 22a snaps under shoulder 68 of liner 66. Removal of igniter 18a from cavity 14 may be accomplished by forcible axial withdrawal thereof, causing the brim of cup 22a to push back and slide past the flexible rim 66.

Locating the inwardly shaped peripheral ridge 66 some distance below the propellant surface 10 provides for positive retention of the igniter assembly 18 a until the burning surface 10 progresses down to the ridge 66. This longer retention provides for more complete consumption of the igniter before it is released by burnoff of the ridge 66, thus minimizing the size and mass of debris released during consumption of the igniter by the motor combustion products.

Any time that the motor must be offloaded after the igniter has been installed, the igniter is removed and the liner also machined to produce a hole for the igniter of the same depth. Otherwise, the igniter nozzles would not be as close to the propellant surface.

Thus, there has been provided, according to the invention, an improvement in an igniter for rocket motors. The improved igniter is characterized as being a closed, rigid pressure vessel or container that does not depend upon a bond between the rocket motor propellant grain and the igniter to hold the igniter pressure, the wall of the container being formed of a consumable filament wound structure that is removably attached to a lined cutout or cavity in the aft end of the motor propellant grain. In the illustrated embodiments, the liner for the igniter is machinable with the aft end of the motor propellant grain whereby propellant grain cutback can readily be achieved to accommodate, as required, a change in mission of the motor.

The igniter according to the invention is further characterized in that the thrust produced by it is radial, that is, substantially parallel to the aft end surface of the propellant grain, and thus neither applies stresses to the motor propellant, nor exerts forces tending to extract the igniter from the cavity in which it is installed.

I claim:

1. An igniter for a rocket motor including a solid propellant haing an aft-end surface, said igniter being mounted in a cavity formed in the said surface of the propellant and being operative to project a stream of flaming gas thereon, comprising:
    a plastic liner for lining the cavity formed in the surface of the propellant,
    a closed pressure vessel having walls and a longitudinal axis, said pressure vessel being positioned in and fastened securely to said liner with a portion extending axially therefrom, said portion of said vessel having a plurality of nozzles therein formed transversely of said axis,
    a hollow cylindrical solid propellant contained in said pressure vessel, and
    means to ignite said hollow cylindrical solid propellant.

2. An igniter as specified in claim 1 wherein the walls of said closed pressure vessel are made of a consumable material.

3. An igniter as specified in claim 2 wherein the walls of said closed pressure vessel are made of an aramid polymer fiber filament.

4. An igniter as specified in claim 2 wherein said liner is bonded to the propellant enclosing the cavity in said surface of the propellant.

5. An igniter as specified in claim 4 wherein said liner includes inwardly projecting peripheral ridge means, and wherein said closed pressure vessel is comprised of two oppositely facing mating cups, one of said cups being sized to fit within the other cup and with the said other cup having its closed end inserted in said liner and being of such length as to be in position to have the brim thereof engage said peripheral ridge means of said liner in locking manner when fully inserted therein.

6. An igniter as specified in claim 5 wherein said hollow cylindrical solid propellant has a substantially constant outer diameter and an undulating inner diameter and wherein said means to ignite said hollow cylindrical solid propellant is contained within a consumable housing located within the hollow cylindrical propellant.

7. An igniter as specified in claim 5 wherein said liner is formed of flexible plastic and said peripheral ridge means comprises a peripheral rim on said liner and includes shoulder means transverse of the longitudinal axis of said closed pressure vessel, said peripheral rim being substantially flush with the surface of the propellant in which the cavity is formed,
    whereby upon insertion axially of said pressure vessel in said liner the said other cup thereof spreads said peripheral rim outwardly to allow the brim thereof to move into locking engagement with said shoulder means and thereby with said liner, said pressure vessel being removable from said liner by spreading of said peripheral rim outwardly and withdrawing said pressure vessel axially from said liner.

8. An igniter as specified in claim 5 wherein said liner is formed of a flexible plastic and said peripheral ridge means thereof is provided on said liner inwardly of the brim thereof and includes shoulder means transverse of the longitudinal axis of said pressure vessel,
    whereby insertion of said pressure vessel in said liner is effected by forcibly moving said largest cup past said peripheral ridge means on said liner until the brim of said largest cup snaps into locking engagement with said shoulder means and thereby with said liner, said pressure vessel being removable from said liner by forcibly moving the brim of said largest cup past said peripheral ridge on said liner.

* * * * *